(12) United States Patent
Quaglia et al.

(10) Patent No.: US 11,554,919 B2
(45) Date of Patent: Jan. 17, 2023

(54) LIFT GATE APPARATUS

(71) Applicant: INTELLIGRATED HEADQUARTERS, LLC, Mason, OH (US)

(72) Inventors: Christopher Quaglia, Baltimore, MD (US); Todd Green, Baltimore, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 17/156,983

(22) Filed: Jan. 25, 2021

(65) Prior Publication Data
US 2021/0261348 A1  Aug. 26, 2021

Related U.S. Application Data

(60) Provisional application No. 62/981,776, filed on Feb. 26, 2020.

(51) Int. Cl.
*B65G 21/14* (2006.01)
*B65G 13/12* (2006.01)
*B65G 41/00* (2006.01)

(52) U.S. Cl.
CPC .......... *B65G 41/002* (2013.01); *B65G 13/12* (2013.01); *B65G 21/14* (2013.01)

(58) Field of Classification Search
None
See application file for complete search history.

(56) References Cited

U.S. PATENT DOCUMENTS

| | | | | |
|---|---|---|---|---|
| 4,047,625 | A * | 9/1977 | Grant ..................... | B65G 13/10 198/463.3 |
| 5,568,857 | A * | 10/1996 | Chen ..................... | B65G 13/12 198/861.5 |
| 10,232,409 | B2 * | 3/2019 | Dugat ..................... | B65G 13/12 |
| 2020/0122928 | A1 * | 4/2020 | Bellar ..................... | B65G 21/14 |

* cited by examiner

*Primary Examiner* — Kavel Singh
(74) *Attorney, Agent, or Firm* — Alston & Bird LLP (57) ABSTRACT

A lift gate apparatus includes a movable conveyor device and a bracket. The movable conveyor device is configured to transition between a conveying position and a non-conveying position. The bracket configured to bridge a gap between the movable conveyor device and a fixed conveyor device, wherein the bracket pivots and slides over the fixed conveyor device when the movable conveyor device is transitioned from the conveying position to the non-conveying position.

20 Claims, 9 Drawing Sheets

FIG.9

LIFT GATE APPARATUS

RELATED APPLICATIONS

This application is a non-provisional application that claims the benefit of priority to U.S. Provisional Application Ser. No. 62/981,776 entitled "LOW PROFILE LIFT GATE WITH RETRACTABLE GAP ROLLERS" filed on Feb. 26, 2020, the entirety of which is incorporated by reference herein.

TECHNOLOGICAL FIELD

Example embodiments of the present invention relates generally to a conveyor system for handling items, and, more particularly, to a lift gate apparatus in use with the conveyor system.

BACKGROUND

Material handling systems are traditionally used to convey, sort, and organize items (e.g., cartons, cases, etc.) at high speeds. Depending on the configuration of the system, the items may travel through the system in an unregulated manner or may be consolidated into a single stream of items. Conveyor systems may rely on a conveyor controller and/or warehouse management system to organize items through all stages of handling and processing.

Conventional conveyor systems may also include a conveyor bed in the form of conveyor rollers or belts supported on a conveyor frame. Examples of such conveyor systems may include a sorter conveyor system, a merge conveyor system, an accumulation conveyor system, an induction conveyor system, or the like. These conveyor systems may be distributed at different locations within a warehouse or a distribution center. Few of these conveyor systems may be located at a confined space within the warehouse due to space constraints. In this regard, accessibility to the conveyor systems becomes difficult during maintenance due to the confined space as one of the conveyor systems may block a pathway to access another conveyor system making it difficult for an operator or a material handling vehicle to access the conveyor systems.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a lift gate apparatus includes a movable conveyor device and a bracket. The movable conveyor device is configured to transition between a conveying position and a non-conveying position. The bracket configured to bridge a gap between the movable conveyor device and a fixed conveyor device, wherein the bracket pivots and slides over the fixed conveyor device when the movable conveyor device is transitioned from the conveying position to the non-conveying position.

Various example embodiments described herein relate to the lift gate apparatus including a lifting mechanism to lift the movable conveyor device to the non-conveying position from the conveying position and lower the movable conveyor device back to the conveying position.

Various example embodiments described herein relate to the lift gate apparatus, wherein the lifting mechanism comprises a handle and a pair of gas springs.

Various example embodiments described herein relate to the lift gate apparatus, wherein the fixed conveyor device and the movable conveyor device comprises at least one of conveyor rollers or a conveyor belt or a slider pan.

Various example embodiments described herein relate to the lift gate apparatus including the bracket which rotates about a pivot point to pivot the bracket and extend it towards and over the fixed conveyor device when the movable conveyor device is transitioned from the conveying position to the non-conveying position.

Various example embodiments described herein relate to the lift gate apparatus including the bracket which rotates about the pivot point to pivot the bracket and retract it away from the fixed conveyor device when the movable conveyor device is transitioned from the non-conveying position to the conveying position.

Various example embodiments described herein relate to the lift gate apparatus with the movable conveyor device being lifted at an angle of at least 90 degrees relative the fixed conveyor device.

Various example embodiments described herein relate to the lift gate apparatus including the bracket which comprises a roller and an angled front portion to slide the bracket over the fixed conveyor device such that the roller moves back and forth over the fixed conveyor device when the movable conveyor device is transitioned between the conveying position and the non-conveying position.

Various example embodiments described herein relate to the lift gate apparatus, wherein the angled front portion of the bracket abuts the fixed conveyor device when the movable conveyor device is at the conveying position and wherein the angled front portion of the bracket is above the fixed conveyor device when the movable conveyor device is at the non-conveying position.

Various example embodiments described herein relate to the lift gate apparatus including a locking mechanism to lock the movable conveyor device at one of the conveying position or the non-conveying position.

Various example embodiments described herein relate to the lift gate apparatus, wherein the locking mechanism is a retractable spring pin.

Various example embodiments described herein relate to the lift gate apparatus including a sensor to determine if the movable conveyor device is in the conveying position or the non-conveying position.

Various example embodiments described herein relate to a conveyor system with plurality of conveyor devices and a lift gate apparatus. The lift gate apparatus includes a first conveyor device configured to be raised from a first position to a second position and lowered back from the second position to the first position. A bracket attached to the first conveyor device, wherein the bracket is configured to pivot and slide over a second conveyor device of the plurality of conveyor devices when the first conveyor device is raised from the first position to the second position.

Various example embodiments described herein relate to a conveyor system, wherein the lift gate apparatus further includes a lifting mechanism to raise and lower the first conveyor device from the first position and the second position respectively.

Various example embodiments described herein relate to a conveyor system, wherein the lift gate apparatus further includes a roller and an angled front portion to slide the bracket over the second conveyor device such that the roller moves back and forth over the second conveyor device when the first conveyor device is transitioned between the first position and the second position.

Various example embodiments described herein relate to a conveyor system, wherein the angled front portion of the bracket abuts the second conveyor device when the first conveyor device is at the first position and wherein the angled front portion of the bracket is above the second conveyor device when the first conveyor device is at the second position.

Various example embodiments described herein relate to a conveyor system, wherein the bracket is configured to bridge a gap between the first conveyor device and the second conveyor device when the first conveyor device is in the first position.

Various example embodiments described herein relate to a conveyor system, wherein the first conveyor device is lifted to at an angle of at least 90 degrees from the first position.

Various example embodiments described herein relate to a method for operating a lift gate apparatus. The method including lifting a movable conveyor device to transition between a conveying position and a non-conveying position relative to a fixed conveyor device and sliding a bracket over the fixed conveyor device when the movable conveyor device is transitioned from the conveying position to the non-conveying position. The method further including retracting the bracket from the fixed conveyor device when the movable conveyor device is transitioned from the non-conveying position to the conveying position such that the bracket bridges a gap between the movable conveyor device and the fixed conveyor device.

Various example embodiments described herein relate to the method further including locking the movable conveyor device at one of the conveying position or the non-conveying position.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

As used herein, the terms "open position," "non-conveying position", "folded position" and similar terms may be used interchangeably to refer to a position of the movable conveyor device in which items cannot be transported by the movable conveyor device. Thus, use of any such terms should not be taken to limit the spirit and scope of embodiments of the present disclosure.

As used herein, the terms "close position," "conveying position", "unfolded position" and similar terms may be used interchangeably to refer to a position of the movable conveyor device in which the items can be transported by the movable conveyor device. Thus, use of any such terms should not be taken to limit the spirit and scope of embodiments of the present disclosure.

As used herein, the term "movable conveyor device" may be used to refer to a conveyor zone or a conveyor unit which can be rotated about a pivot point. The term "fixed conveyor device" may be used to refer to a conveyor zone or a conveyor unit positioned either upstream or downstream to the movable conveyor device. Thus, use of any such terms should not be taken to limit the spirit and scope of embodiments of the present disclosure.

As used herein, the term "space", "pathway" or "opening" may be used to refer to an area between conveyor zones of a conveyor system through which an operator or a material handling vehicle can travel across freely. Such an area is created by repositioning a conveyor zone. Thus, use of any such terms should not be taken to limit the spirit and scope of embodiments of the present disclosure.

As used herein, the term "gap" may be used to refer to a space created between the movable conveyor device and the fixed conveyor device after installation of the conveyor system. Thus, use of any such terms should not be taken to limit the spirit and scope of embodiments of the present disclosure.

Generally, conveyor systems may be distributed at different locations within a warehouse or distribution center. Few of these conveyor systems may be arranged close to each other in a confined space in the warehouse blocking a pathway to access other conveyor systems. Accordingly, an operator or a material handling vehicle may be forced to maneuver through a complex route to reach the conveyor systems due to the blocking of the pathway. In such scenarios, time taken for the operator or the material handling vehicle for performing activities such as order fulfilment, picking, packing, or maintenance may increase resulting in a reduced throughput. In some examples, several zones of the conveyor system may be arranged compactly in the confined space due to space constraints. For example, the zones may be arranged in the form of a rectangular shape with any one side or two sides of the rectangle abutting against a wall of the warehouse. In such scenarios, accessibility to the zones on the sides abutting the wall becomes practically impossible as there is no pathway to reach such zones. In this regard, the operator or the material handling vehicle may have reduced accessibility to such zones. Accordingly, the operator may be forced to dismantle a portion of the conveyor system to create a space or the pathway to access the other zones abutting the wall. Such dismantling may be a laborious and a time-consuming task. Further, the operator may be forced to cross or leap over the portion of the conveyor system to access other zones, however, such cross over is not feasible when that conveyor system is operational. Therefore, there is a need for the operator or the material handling vehicle to access all the conveyor zones or conveyor systems in the warehouse at ease without time delay and with minimal effort.

Further, a person skilled in the conveyor art, may use a conventional lift gate as a part of the conveyor system, which can be movable or pivotable to an open position or a non-conveying position to create the space or the pathway for the operator or the material handling vehicle to reach an intended conveyor zone of the conveyor system. Such conventional lift gates have several drawbacks, such as, but not limited to use of multiple mounting components beneath the lift gate for support, use of multiple mounting brackets upstream and downstream of the lift gate for attachment with neighboring zones, use of conventional mechanisms which slams the lift gate against the conveyor frame when pivoting the lift gate between the open position and a close position.

In an example, when using multiple mounting components, for example, mounting brackets or mounting struts, beneath the conveyor lift gate for support, the multiple mounting components may hinder a movement of the operator and the material handling vehicle when the lift gate is in the open position or non-conveying position. For example, a portion of these multiple mounting components may protrude out when the lift gate is in the open position or non-conveying position and such portions may partially block the pathway and may raise safety concerns for the operator and the material handling vehicle when travelling past the lift gate as there is a risk of collision and unexpected slamming of the lift gate from the open position to the close position as result of the collision.

In another example, when using multiple mounting brackets upstream and downstream of the conveyor lift gate for attachment to the upstream conveyor and the downstream conveyor, a gap is created between the upstream/downstream conveyor and the lift gate. This gap may increase the risk of small items being conveyed on the conveyor system to be trapped in the gap leading to an operational failure of the conveyor system. Further, installation of multiple mounting brackets may be laborious and may involve modifying or adding additional components to both upstream conveyor and the downstream conveyor which makes the lift gate to be used only for a specific conveyor system and cannot be retrofitted into any other existing conveying system.

In yet another example, when using mechanisms which slams the lift gate against the conveyor frame when pivoting the lift gate, there is a possibility of a physical damage of the lift gate and the conveyor frame which may lead to increase in maintenance and repair costs. Further, there is a possibility of the operator's finger to be pinched between the lift gate and the conveyor frame when the lift gate slams against the conveyor frame.

Through applied effort, ingenuity, and innovation, many of the above identified problems have been solved by developing solutions that are included in embodiments of the present disclosure, many examples of which are described in detail herein. The present disclosure relates to a lift gate apparatus with a movable conveyor device configured to transition between a conveying position and a non-conveying position. A bracket attached to the movable conveyor device configured to bridge a gap between the movable conveyor device and a fixed conveyor device, wherein the bracket pivots and slides over the fixed conveyor device when the movable conveyor device is transitioned from the conveying position to the non-conveying position.

According to an embodiment, the bracket rotates about a pivot point to pivot the bracket and extend it towards and over the fixed conveyor device when the movable conveyor device is transitioned from the conveying position to the non-conveying position.

According to an embodiment, the bracket rotates about the pivot point to pivot the bracket and retract it away from the fixed conveyor device when the movable conveyor device is transitioned from the non-conveying position to the conveying position.

According to an embodiment, the bracket comprises a roller and an angled front portion to slide the bracket over the fixed conveyor device such that the roller moves back and forth over the fixed conveyor device when the movable conveyor device is transitioned between the conveying position and the ion-conveying position.

According to an embodiment, the lift gate apparatus further comprises a lifting mechanism to lift the movable conveyor device to the non-conveying position from the conveying position and lower the movable conveyor device back to the conveying position. The lifting mechanism comprises a handle and a pair of gas springs.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical electrical and other changes may be made without departing from the general scope of the disclosure. The following detailed description is, therefore, not to be taken in a limiting sense, and the scope of the present disclosure is defined by the appended claims and equivalents thereof.

Throughout this specification, the term 'conveyors' or 'conveyor devices' may be used interchangeably and these terms should be taken as an example of both roller conveyor, a belt conveyor or their combination.

Throughout this specification, the term 'rollers' or 'conveyor rollers' may be used interchangeably and the term 'belt' or 'conveyor belt' may be used interchangeably and should be taken as an example of a medium which transports items on the conveyor system.

Figure 1:
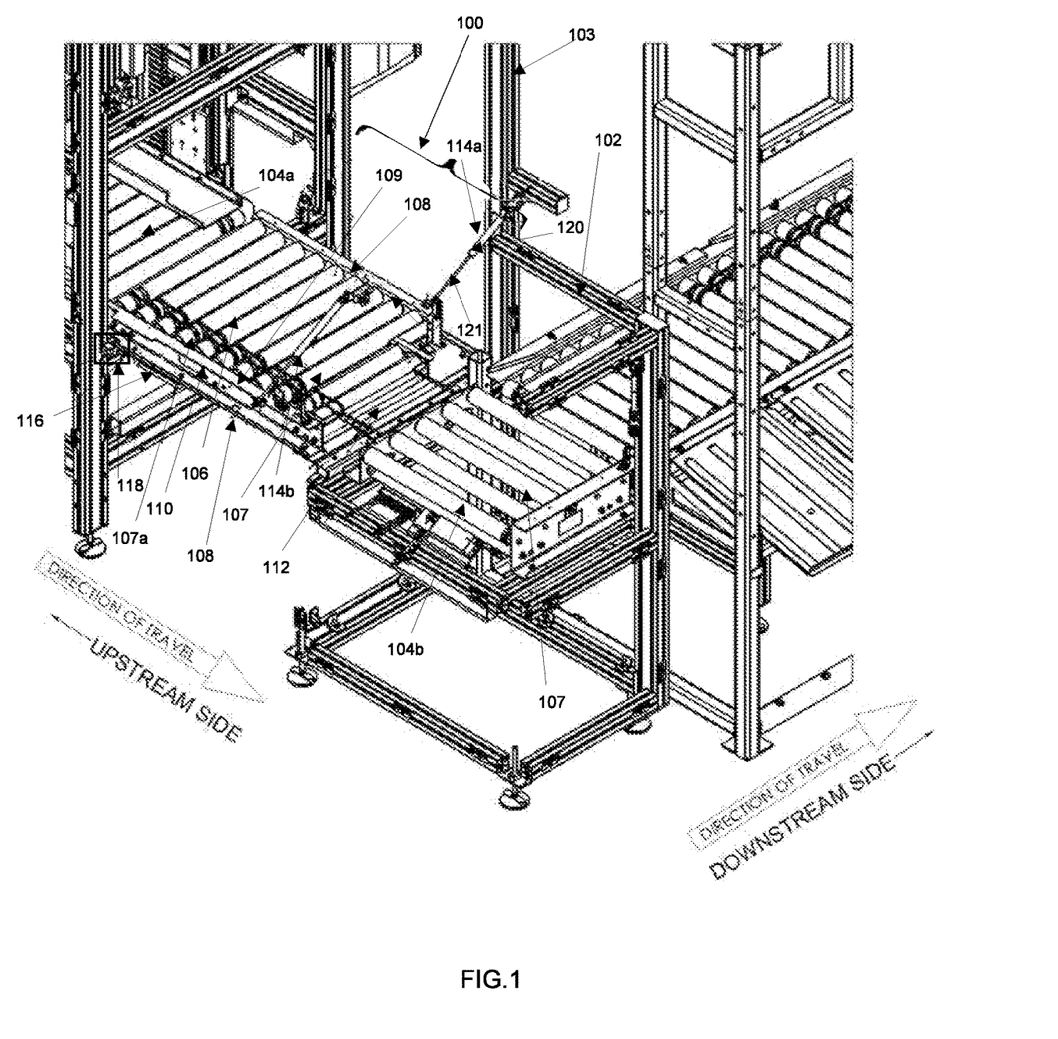
FIG. 1 illustrates a perspective view of a section of a conveyor system having a lift gate apparatus in a conveying position in accordance with an embodiment of the present invention.
Figure 2:
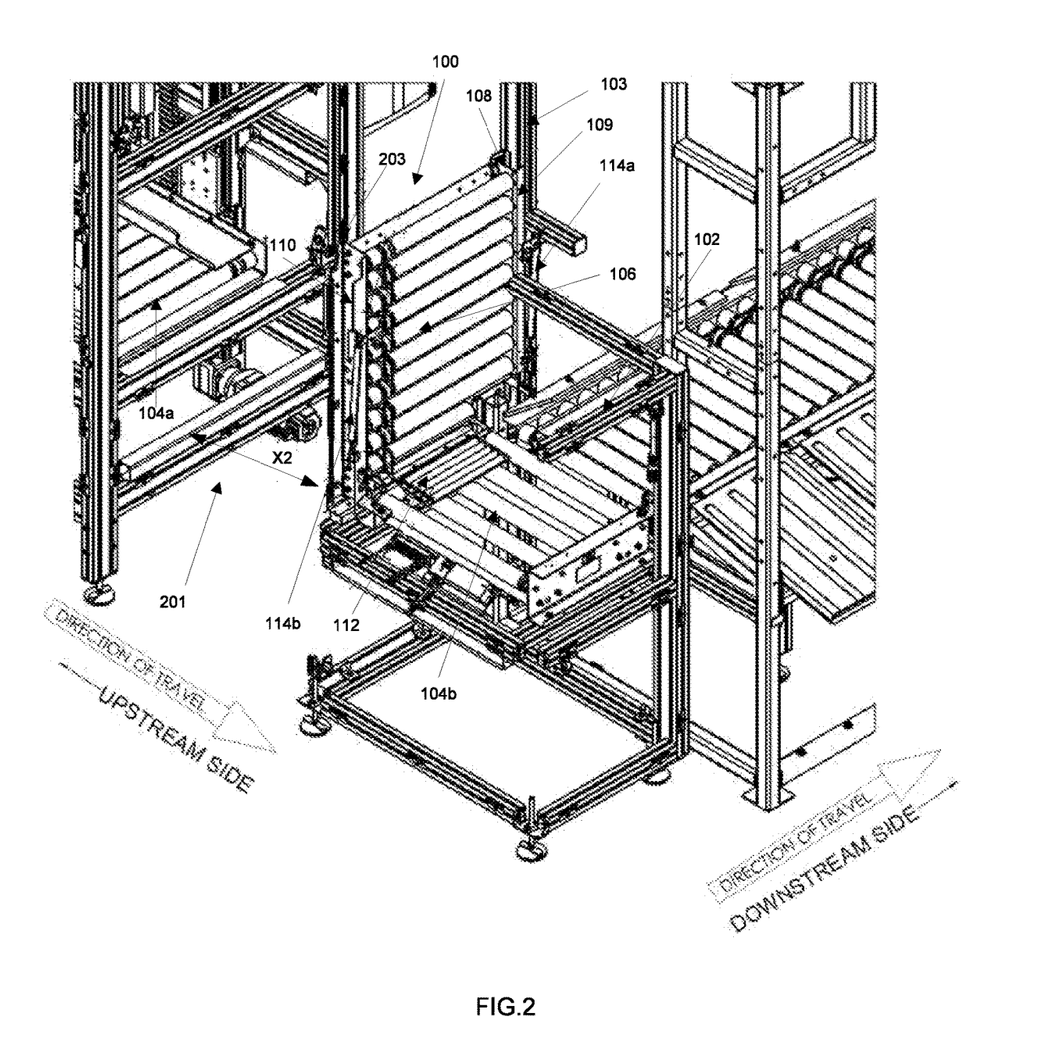
FIG. 2 illustrates a perspective view of a section of a conveyor system having the lift gate apparatus in a non-conveying position in accordance with an embodiment of the present invention.

Referring now specifically to the drawings and the illustrative embodiments depicted therein, FIG. 1 illustrates a perspective view of a section of a conveyor system having a lift gate apparatus 100 in a conveying position in accordance with an embodiment of the present invention. The section of the conveyor system as shown in FIG. 1 includes a conveyor frame 102 supporting multiple conveyor devices. One of the multiple conveyor devices acts a lift gate apparatus 100. As shown in FIG. 1, the lift gate apparatus 100 is positioned in between two conveyor devices 104a, 104b. The two conveyor devices 104a, 104b may be fixed conveyor devices with one fixed conveyor device 104a positioned upstream of the lift gate apparatus 100 and another fixed conveyor device 104b positioned downstream of the lift gate apparatus 100. According to an embodiment, the lift gate apparatus 100 comprises a movable conveyor device 106. The movable conveyor device 106 being positioned in between the upstream and downstream fixed conveyor devices 104a, 104b. A portion of the conveyor frame 102 is removed from FIG. 1 for clarity such that the lift gate apparatus 100 and associated components are clearly visible. An item is transported from the upstream fixed conveyor device 104a to the downstream fixed conveyor device 104b in a direction of travel indicated by arrows shown in FIG. 1. For explanation of the illustration shown in FIG. 1, the movable conveyor device may 106 be considered as a first conveyor device and the downstream fixed conveyor device 104b may be considered a second conveyor device and the item travelling downstream from the first conveyor device 106 to the second conveyor device 104b and so on. In some examples, the first conveyor device 106 and the second conveyor device 104b comprises at least one of conveyor rollers or a conveyor belt or a slider pan. In the illustration shown in FIG. 1, the first conveyor device 106 and the second conveyor device 104b comprises conveyor rollers 107. In the embodiment shown in FIG. 1, the conveyor rollers 107 of the second conveyor device 104b are positioned perpendicular to the conveyor rollers 107 of the first conveyor device 106, however, feasible are other arrangements in which the conveyor rollers 107 of the second conveyor device 104b and the first conveyor device 106 are positioned in parallel. As shown in FIG. 1, the first conveyor device 106 includes a pair of side frames 108 and the conveyor rollers 107 positioned in between the pair of side frames 108. The conveyor rollers 107 may include idler rollers and a motor driven roller (MDR). The motor-driven roller may drive the idler rollers through O-bands or O-rings. One of the pair of side frames 108 is a locking side frame and the other side frame is a non-locking side frame. According to an embodiment, the locking side frame includes components configured to lock the movable conveyor device 106 in the conveying position as shown in FIG. 1 and a non-conveying position as shown in FIG. 2. Further, each of the side frames 108 include a top portion 109 and a side portion 110 to receive components configured to support and lift the movable conveyor device 106. These components are explained in detail in the exploded view shown in FIGS. 4, 5 and 6.

According to an embodiment, the movable conveyor device 106 is rotated or pivoted from the conveying position to the non-conveying position and vice-versa. The movable conveyor device 106 creates a space or a pathway 201 as shown in FIG. 2 for an operator or a material handling vehicle to pass through the pathway 201 when the movable conveyor device 106 is transitioned from the conveying position to the non-conveying position. In some examples, the material handling vehicle may a forklift, an AGV (Automated Guided Vehicle), a AMR (Autonomous mobile vehicle), a trolley cart and other vehicles transporting items within the warehouse. For example, in the non-conveying position, as shown in FIG. 2, the movable conveyor device 106 does not transport any item and allows the operator or the material handling vehicle to travel across the movable conveyor device 106 via the pathway 201. According to an embodiment, when the movable conveyor device 106 is in the non-conveying position, an operation of the section of the conveyor system is temporarily halted. For example, in the conveying position, as shown in FIG. 1, the movable conveyor device 106 acts as an intermediate conveyor between the upstream fixed conveyor device 104a and the downstream fixed conveyor device 104b transporting an item from the upstream fixed conveyor device 104a to the downstream fixed conveyor device 104b.

Figure 3:
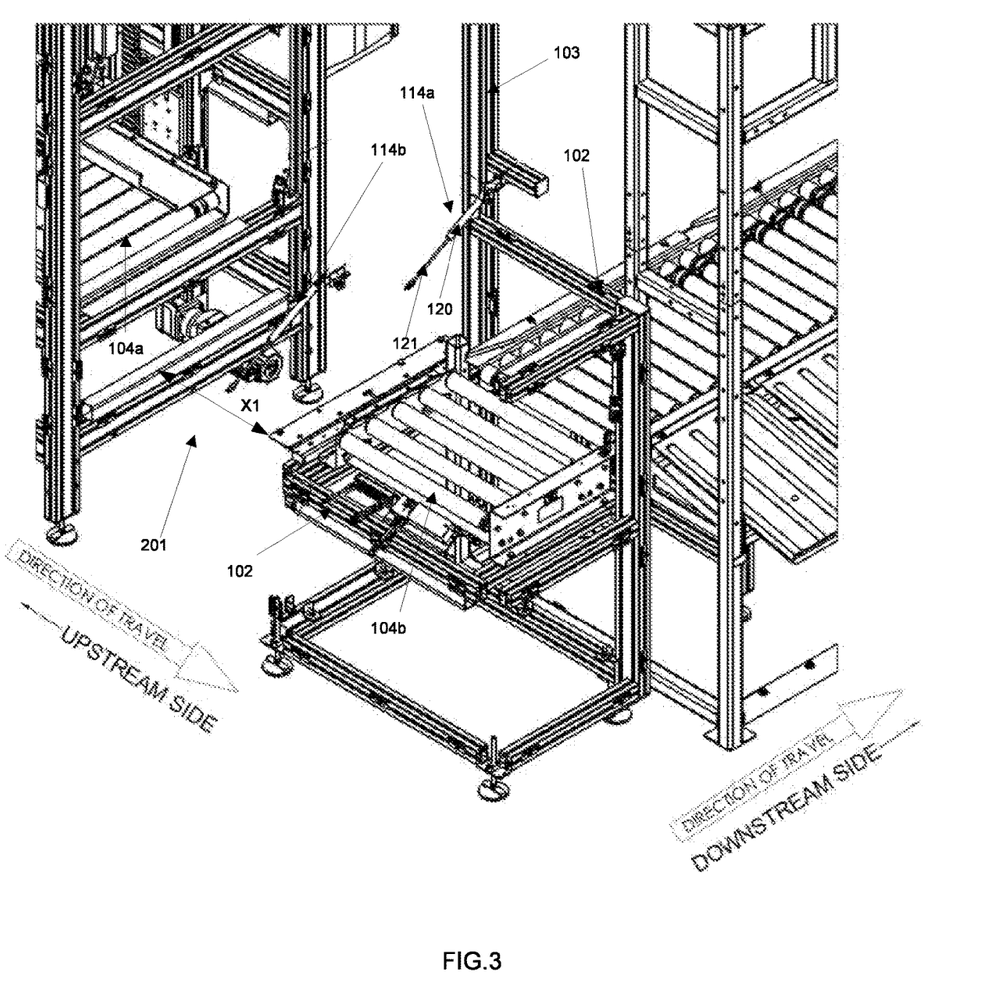
FIG. 3 illustrates a perspective view of a section of a conveyor system without the lift gate apparatus in accordance with an embodiment of the present invention.

According to an embodiment, the movable conveyor device 106 is pivoted to the non-conveying position from the conveying position to create the space or the pathway 201. In some examples, the movable conveyor device 106 is pivoted and positioned at a 90-degree angle with respect to the downstream fixed conveyor device 104b in the non-conveying position. Further, as shown in FIG. 2, the movable conveyor device 106 does not obstruct the created space or the pathway 201 when the movable conveyor device 106 is in the non-conveying position. For example, a first length X1 of the space or the pathway 201, as shown in FIG. 3, between the two fixed conveyor devices 104a, 104b without installing the movable conveyor device 106 is equal to a second length X2 of the space or the pathway 201, as shown in FIG. 2, between the two fixed conveyor devices 104a, 104b with the movable conveyor device 106. Accordingly, it is understood that there is no difference in the first length X1 and the second length X2 of the space or pathway 201 existing before and created after installation of the lift gate apparatus 100. In other words, the space or the pathway 201 created by the lift gate apparatus 100 is unobstructed by any components of the lift gate apparatus 100. In some examples, the pathway 201 created by the movable conveyor device 106 allows the operator or the material handling vehicle to easily access any zone of the conveyor system located within the confined space in the warehouse without any collision against the components of the lift gate apparatus 100 as there is no difference in the length X1, X2 of the space or pathway 201 before and after installation of the lift gate apparatus 100. As shown in FIG. 2, the lift gate apparatus 100 does not include any components positioned underneath the lift gate apparatus 100 that protrude or obstruct the pathway 100. In this regard, a time taken for the operator or the material handling vehicle to cross the pathway is greatly reduced without compromising the safety of the operator and the material handling vehicle. The lift gate apparatus 100 shown in FIG. 1 may be simple in construction with fewer components than conventional lift gates known in the conveyor art. According to an embodiment, the lift gate apparatus 100 further comprises a bracket 112, a lifting mechanism 114a, 114b, 116 and a locking mechanism 118. The components of the bracket 112, lifting mechanism 114a, 114b, 116 and the locking mechanism 118 is explained in detail in conjunction with FIGS. 4, 5 and 6.

Figure 4:
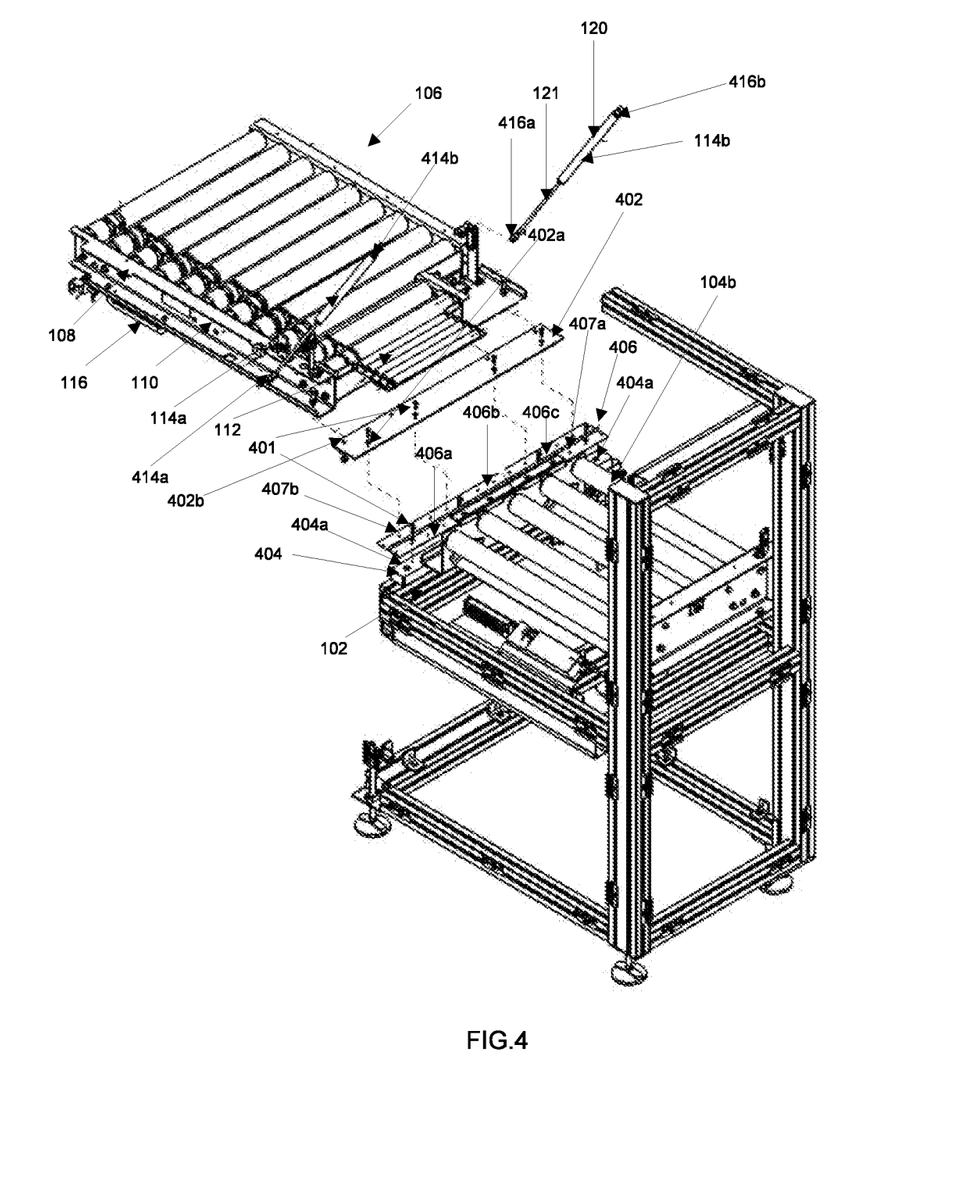
FIG. 4 illustrates an exploded perspective view of the lift gate apparatus in accordance with an embodiment of the present invention.

FIG. 4 illustrates an exploded perspective view of the lift gate apparatus in accordance with an embodiment of the present invention. As discussed previously, the lift gate apparatus 100 comprises the movable conveyor device 106, the bracket 112, the lifting mechanism 114a, 114b, 116 and the locking mechanism 118. In FIG. 4, the movable conveyor device 106 is shown to be detached from the downstream fixed conveyor device 104b such that mounting components to mount the movable conveyor device 106 with the downstream fixed conveyor device 104b are clearly visible. According to an embodiment, the movable conveyor device 106 is attached to the downstream fixed conveyor device 104b with the mounting components such as a mount plate 402, a hinge mount block 404 and a hinge plate 406. The mounting components are coupled to each other using suitable fasteners 401, such as, but not limited to a nut, a bolt, a washer, a screw, a clip, a clamp and their combination. For example, the hinge mount block 404 is fastened to the conveyor frame 102 of the downstream fixed conveyor device 104b using the suitable fasteners 401. In some examples, the hinge mount block 404 may be an integral component of the conveyor frame 102. According to an embodiment, the hinge mount block 404 and the hinge plate 406 are coupled to each other using the suitable fasteners 401. In some examples, the hinge mount block 404 includes first apertures 404a to receive the suitable fasteners 401.

According to an embodiment, the hinge plate 406 includes a first segment 406a, a second segment 406b and a hinge 406c between the first segment 406a and the second segment 406b. The first segment 406a, the second segment 406b and the hinge 406c exists as a single molded piece. The first segment 406a includes first holes 407a and the second segment 406b includes second holes 407b. According to an embodiment, the first holes 407a of the hinge plate 406 are seated on top of the first apertures 404a of the hinge mount block 404 and secured together using the suitable fasteners 401. For example, the first apertures 404a and the first holes 407a may be equidistantly distributed with the first holes 407a overlapping the first apertures 404a when the hinge plate 406 is seated on the hinge mount block 404. In some examples, number of first holes 407a on the first segment 406a may be equal to number of first apertures 404a on the hinge mount block 404. According to an embodiment, the first apertures 404a may be provided on the conveyor frame 102 without use of the hinge mount block 404. In such scenarios, the hinge plate 406 may be attached directly to the first apertures 404a of conveyor frame 102. In some examples, the first holes 407a and the first apertures 404a may be threaded or non-threaded depending on a type of fastener employed to couple the hinge plate 406 and the hinge mount block 404.

According to an embodiment, the second segment 406b of the hinge plate 406 is attached to the mount plate 402. The mount plate 402 includes second apertures 402a. According to an embodiment, the second apertures 402a of the mount plate 402 are seated on top of the second holes 407b of the hinge plate 406 and secured together using the suitable fasteners 401. For example, the second apertures 402a and the second holes 407b may be equidistantly distributed with the second holes 407b overlapping the second apertures 402a when the mount plate 402 is seated on the hinge plate 406. In some examples, the number of second holes 407b on the second segment 406b may be equal to the number of second apertures 402a on the mount plate 402. According to an embodiment, the second apertures 402a may be provided on a bottom portion (not shown) of the pair of side frames 108 of the movable conveyor device 106 without use of the mount plate 402. In such scenarios, the second segment 406b may be attached directly to the bottom portion of the pair of side frames 108. In some examples, the second holes 407b and the second apertures 402a may be threaded or non-threaded depending on the type of fastener employed to couple the hinge plate 406 and the mount plate 402. According to an embodiment, the mount plate 402 may be coupled to the bottom portion of the pair of side frames 108 using third apertures 402b. In this regard, the second apertures 402a are used for coupling with the hinge plate 406 and the third apertures 402b are used for coupling with the bottom portion of the pair of side frames 108.

In this regard, the first segment 406a of the hinge plate 406 is attached to the hinge mount block 404 and the second segment 406b of the hinge plate 406 is attached to the mount plate 402. Therefore, the hinge plate 406 appears to be a component connecting the mount plate 402 with the hinge mount block 404. Accordingly, the movable conveyor device 106 is coupled to the downstream fixed conveyor device 104b using the hinge plate 406 and the mount plate 402. According to an embodiment, the hinge 406c of the hinge plate 406 acts as a pivot point for pivoting the movable conveyor device 106 from the conveying position to the non-conveying position. According, to an embodiment, the hinge mount block 404 may be provided with a wear-resisting pad (not shown) to avoid wear and tear of the hinge mount block 404 as there is a possibility of the hinge mount block 404 to corrode and rust over time due to repeated pivoting of the movable conveyor device 106.

According to an embodiment, the lifting mechanism comprises a handle 116 and a pair of gas springs 114a, 114b. The handle 116 and the pair of gas springs 114a, 114b is attached to the movable conveyor device 106. For example, the pair of gas springs 114a, 114b includes a first gas spring 114a and a second gas spring 114b, each having a pair of mounting portions 414a, 414b, 416a, 416b. For example, the first gas spring 114a includes a first pair of mounting portions 414a, 414b, each positioned in opposing ends of the first gas spring 114a. Similarly, the second gas spring 114b includes a second pair of mounting portions 416a, 416b, each positioned in opposing ends of the second gas spring 114b. One of the mounting portion 414a of the first pair of mounting portions 414a, 414b is coupled to the movable conveyor device 106 and the other mounting portion 414b is coupled to the conveyor frame 102. Similarly, one of the mounting portion 416a of the second pair of mounting portions 416a, 416b is coupled to the movable conveyor device 106 and the other mounting portion 41bb is coupled to the conveyor frame 102. As shown in FIG. 1 and FIG. 3, the mounting portions 414b, 416b are coupled to a vertical mast 103 of the conveyor frame 102 and the other mounting portions 414a, 416a are coupled to the side portion 110 of the locking side of the side frame 108. According to an embodiment, the first pair mounting portions 414a, 414b and the second pair of mounting portions 416a, 416b on the first gas spring 114a and the second gas spring 114b are shoulder bolts. According to another embodiment, the first pair mounting portions 414a, 414b and the second pair of mounting portions 416a, 416b may be any suitable fastener known to a person skilled in the art to couple the first gas spring 114a and the second gas spring 114b with the movable conveyor device 106 and the conveyor frame 102. According to an embodiment, the first gas spring 114a and the second gas spring 114b may include a pressurized gas cylinder 120 and a piston rod 121 as commonly known in the art configured to raise and lower heavy masses without much effort. The piston rod 121 may slide into the interior of the pressurized gas cylinder 120 compressing volume and increasing pressure inside the cylinder 120 when the movable conveyor device 106 is transitioned from the conveying position to the non-conveying position.

Figure 5:
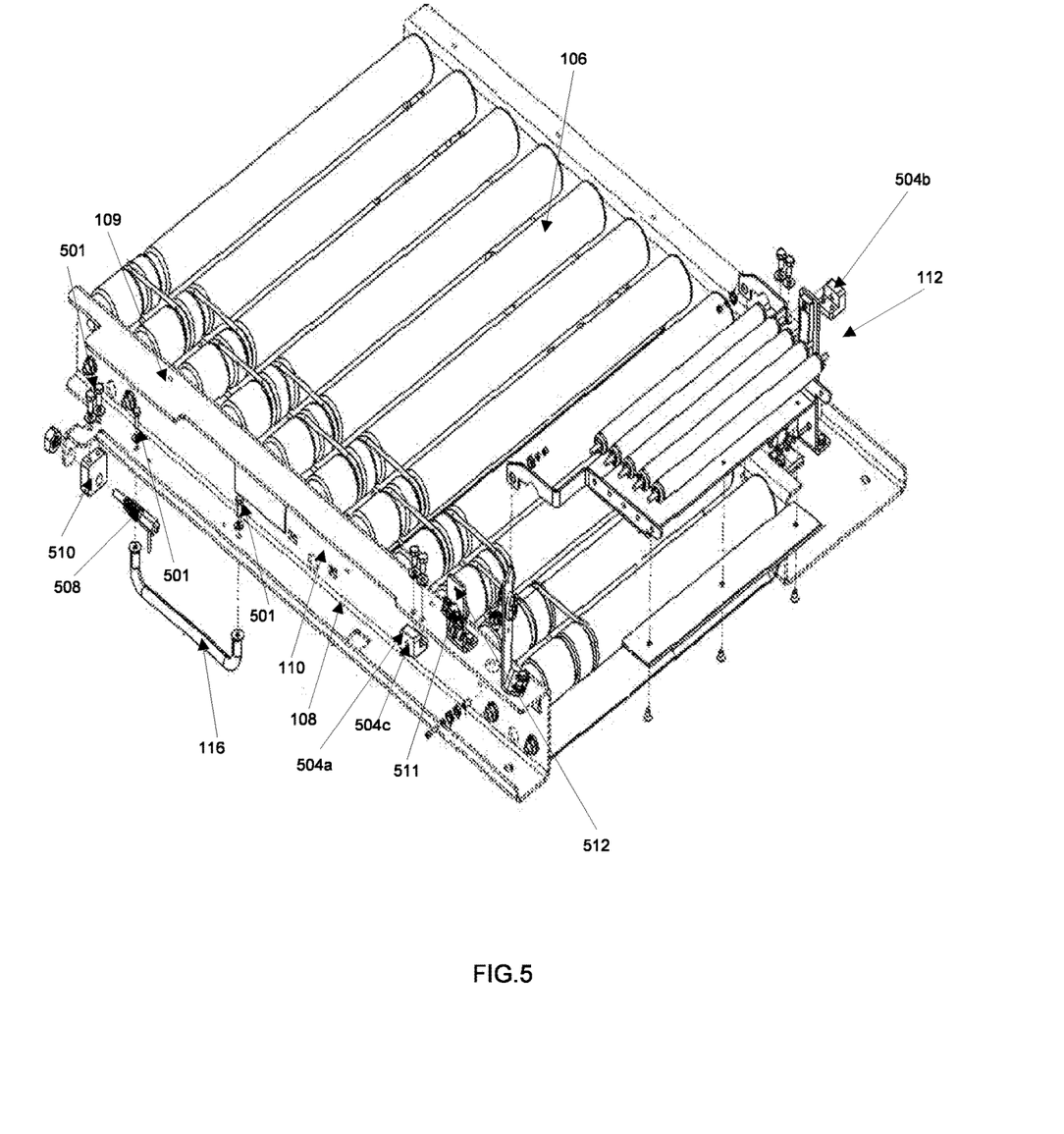
FIG. 5 illustrates an exploded perspective view of a movable conveyor device in accordance with an embodiment of the present invention.

According to an embodiment, as shown in FIG. 5, the handle 116 is attached to the bottom portion (not shown) of the locking side of the side frame 108 using the suitable fasteners 501 known in the art, such as, but not limited to, a nut, a bolt, a washer, a screw, a clip, a clamp and their combination. In some examples, the handle 116 may be attached on the top portion 109 or the side portion 110 of the locking side of the side frame 108 using the suitable fasteners 501. According to an embodiment, as shown in FIG. 5, the movable conveyor device 106 includes a first gas spring pivot block 504a positioned on the side portion 110 of each of the side frames 108. The first gas spring pivot block 504a is coupled to the side portion 110 using the suitable fasteners 501. The first gas spring pivot block 504a receives one of the mounting portions 414a, for example, the shoulder bolt of the first gas spring 114a. For example, the first gas spring pivot block 504a includes a first opening 504c which mates with the shoulder bolt 414a of the first gas spring 504a to establish a pivoting connection between the first gas spring 114a and the first gas spring pivot block 504a. Likewise, the second gas spring 114b is mounted to the side portion 110 of the side frame 108 using a second gas spring pivot block 504b. For example, the second gas spring pivot block 504b includes a second opening (not shown) which mates with the shoulder bolt 416a of the second gas spring 114b to establish a pivoting connection between the second gas spring 114b and the second gas spring pivot block 504b. In this regard, the first gas spring 114a and the second gas spring 114b are coupled to the movable conveyor device 106. Further, other mounting portions 414b, 416b as shown in FIG. 4 is mounted to a corresponding spring mounting block (not shown) coupled to the vertical mast 103 (as shown in FIGS. 1 and 2) of the conveyor frame 102. The first gas spring 114a and the second gas spring 114b may be configured to handle a weight of the movable conveyor device 106 at the conveying position and configured to gradually move the movable conveyor device 106 from the conveying position to the non-conveying position and vice-versa when the movable conveyor device 106 is lifted using the handle 116.

According to an embodiment, the locking mechanism 118 includes a locking pin 508 and a locking pin mount block 510. The locking pin mount block 510 is coupled to the side portion 110 of the locking side of the side frame 108 using the suitable fasteners 501. According to an embodiment, the locking pin mount block 510 includes a provision to mount the locking pin 508. The locking pin 508 is mounted on the locking pin mount block 510 using the suitable fasteners 501. In some example, the locking pin 508 can be a pin with a retractable spring mechanism to lock the movable conveyor device 106 at the conveying position and the non-conveying position. In some examples, the locking pin 508 can be a pin with a latching mechanism to lock the movable conveyor device 106 at the conveying position and the non-conveying position. According to an embodiment, the vertical conveyor frame 102 may include a locking bracket 119 (as shown in FIG. 2) to receive the locking pin 508. In some examples, the locking bracket 119 may be positioned above the second gas spring pivot block 504b. The locking pin 508 is inserted into the locking bracket 119 to lock the movable conveyor device 106 with the conveyor frame 102 in the non-conveying position. In this regard, the locking mechanism 118 may prevent an accidental fall of the lift gate apparatus 100 when placed in the non-conveying position. According to an embodiment, the movable conveyor device 106 further includes a photo eye sensor 511 mounted on a sensor mount 512 positioned on the top portion 109 of the locking side of the side frame 108 to detect presence of items transported on the movable conveyor device 106. According to an embodiment, the movable conveyor device 106 further includes additional sensors (not shown), such as, but not limited to a proximity switch with corresponding sensor mount to detect whether the movable conveyor device 106 is in the conveying position or the non-conveying position.

Figure 6:
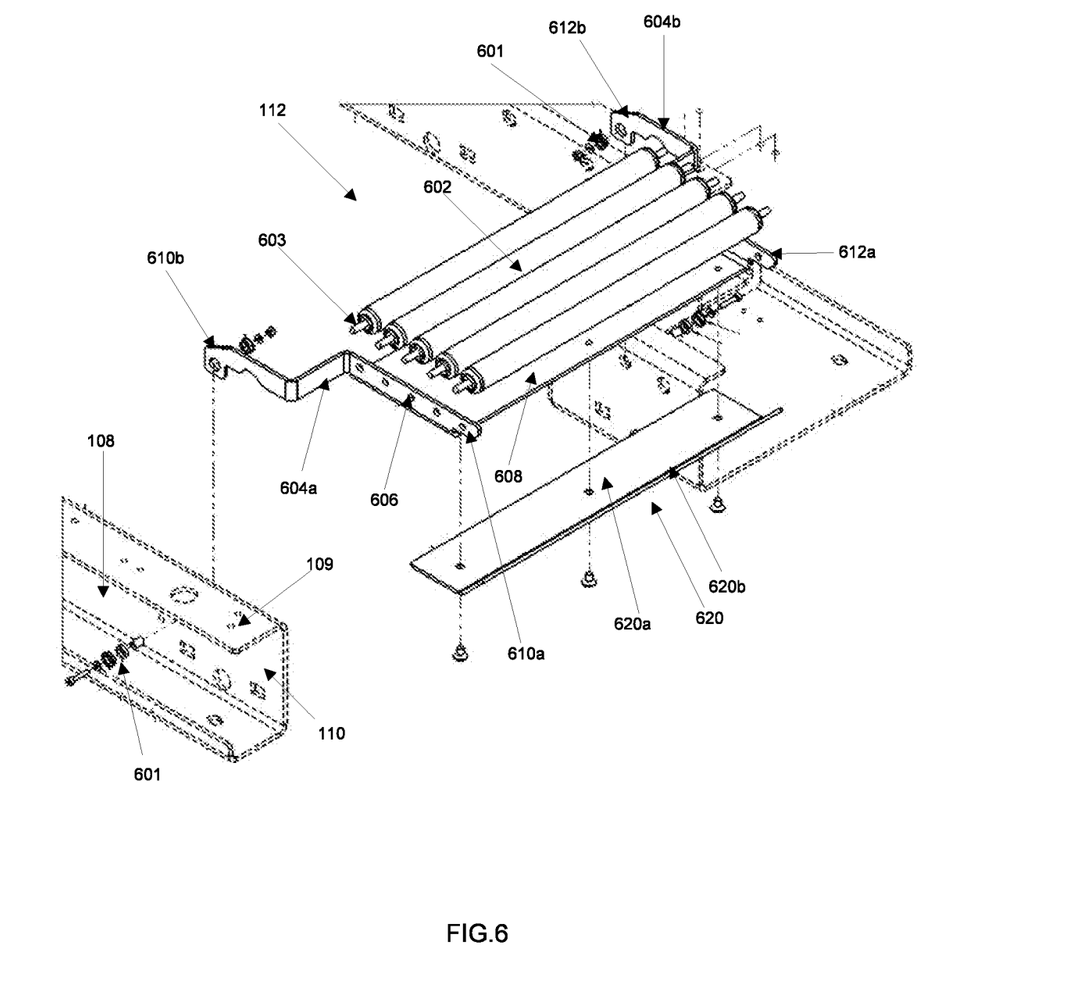
FIG. 6 illustrates an exploded perspective view of a bracket attached to the movable conveyor device in accordance with an embodiment of the present invention.

According to an embodiment, as shown in FIG. 6, the bracket 112 is attached to the movable conveyor device 106. The bracket 112 bridges a gap 201 between the movable conveyor device 106 and the downstream fixed conveyor device 104b as shown in FIG. 1 such that the items transported downstream the movable conveyor device 106 are not stuck or trapped in the gap 201 leading to damage of the items. As shown in FIG. 6, the bracket 112 is attached to the side portion 110 of each side frame 108 of the movable conveyor device 106. According to an embodiment, as shown in FIG. 6, the bracket 112 includes multiple rollers 602 positioned in between a pair of support frames 604a, 604b. According to another embodiment, the bracket 112 includes at least one roller positioned in between the pair of support frames 604a, 604b. Further, each support frame 604a, 604b includes roller openings 606 to receive axles 603 of the rollers 606. As shown in FIG. 6, the bracket 112 further includes a support plate 608 with the rollers 602 resting on top of the support plate 608. The support plate 608 acts as a bridge connecting the pair of support frames 604a, 604b as shown in FIGS. 5 and 6. According to another embodiment, the rollers 602 may be positioned between the pair of support frames 604a, 604b without the requirement of the support plate 608. According to an embodiment, each of the support frames 604a, 604b include a first end 610a, 612a and a second end 610b, 612b. The second end 610b, 612b is pivotably coupled to the side portion 110 of each side frame 108 of the movable conveyor device 106 using suitable fasteners 601, such as, but not limited to, a pivot bearing, a bearing spacer, a bolt sleeve, a nut, a washer, or their combination. In this regard, a pivot point is formed for the bracket 112 to be rotated by pivotably coupling the second end 610b, 612b with the side frame 108 using the suitable fasteners 601. According to an embodiment, the bracket 112 rotates about the pivot point to pivot the bracket 112 and extend it towards and over the downstream fixed conveyor device 104a when the movable conveyor device 106 is transitioned from the conveying position to the non-conveying position.

As shown in FIG. 6, the bracket 112 further includes a gliding plate 620 coupled to the support plate 608. The gliding plate 620 abuts the first end 610a, 612a of the pair of support frames 604a, 604b when the gliding plate 620 is coupled to the support plate 608. According to an embodiment, the gliding plate 620 may be attached directly to the pair of support frames 604a, 604b without the requirement of the support plate 608. According to an embodiment, the gliding plate 620 is an angular plate with two opposing surfaces 620a, 620b bifurcated at an obtuse angle. The gliding plate 620, the support plate 608 and the first end 610a, 612a of the pair of support frames 604a, 604b when coupled together forms an angled front portion for the bracket 112. The angled front portion is configured to slide the bracket 112 over the downstream fixed conveyor device 104b such that the rollers 602 on the bracket 112 can move back and forth over the downstream fixed conveyor device 104b when the movable conveyor device 106 is transitioned between the conveying position and the non-conveying position and vice-versa. According to an embodiment, as shown in FIG. 7, the angled front portion of the bracket 112 abuts the downstream fixed conveyor device 104b when the movable conveyor device 106 is at the conveying position, According to an embodiment, as shown in FIG. 8, the angled front portion is above the downstream fixed conveyor device 104b when the movable conveyor device 106 is at the non-conveying position.

Figure 7:
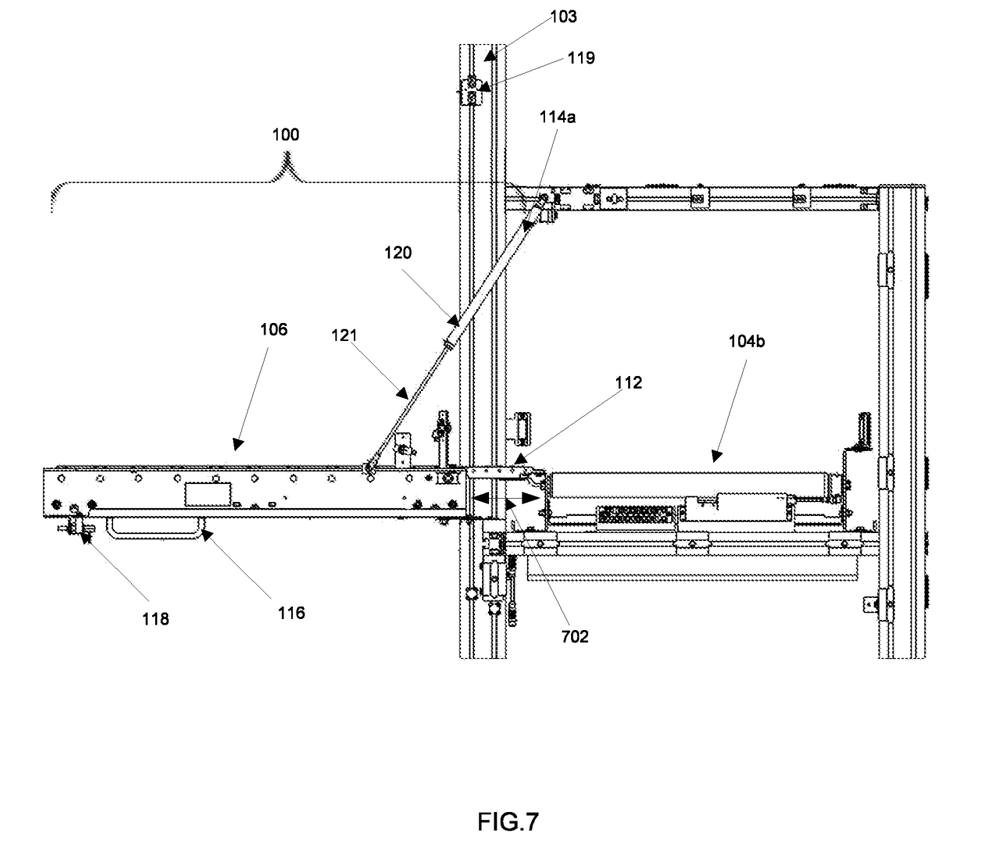
FIG. 7 illustrates a side view of the lift gate apparatus in a conveying position in accordance with an embodiment of the present invention.
Figure 8:
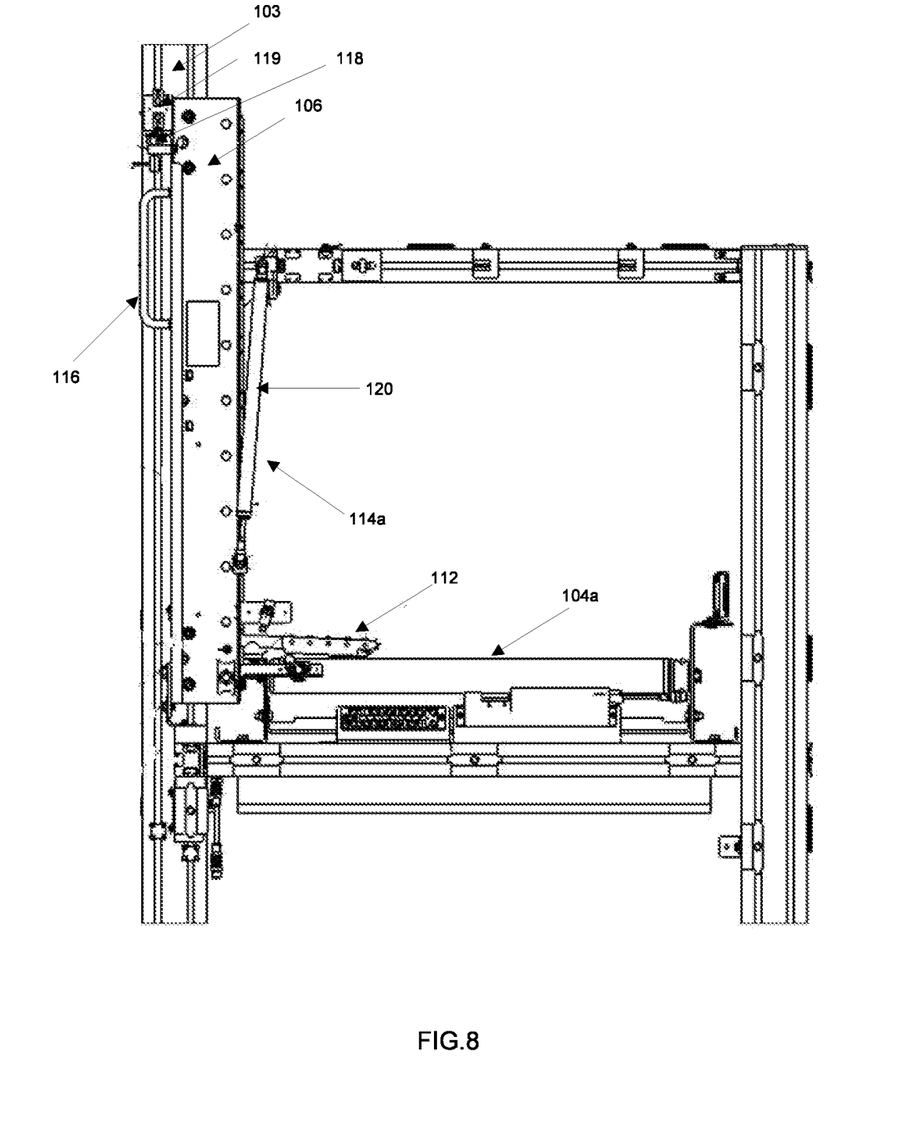
FIG. 8 illustrates a side view of the lift gate apparatus in a non-conveying position in accordance with an embodiment of the present invention.

In the embodiment shown in FIG. 7, the gap existing between the downstream fixed conveyor device 104b and the movable conveyor device 106 in the conveying position is bridged using the bracket 112 with multiple rollers 602 as previously discussed. The bracket 112 with the multiple rollers 602 allows a smooth transition of the item conveyed from the movable conveyor device 106 to the downstream fixed conveyor device 104b. As shown in FIG. 7, the piston rod 121 of the gas springs 114a is in the expanded position fully extended from the pressurized gas cylinder 120 providing a support to the movable conveyor device 106 at the conveying position. The piston rod 121 of the gas spring 114a is compressed into the pressurized gas cylinder 120 when the movable conveyor device 106 is lifted from the conveying position. As shown in FIG. 8, the piston rod 121 of the gas spring 114a is in the fully compressed position when the movable conveyor device 106 is in the non-conveying position. In this regard, the movable conveyor device 106 may be transitioned gradually from the conveying position to the non-conveying position and vice-versa by expansion and compression of the gas spring 114a. According to an embodiment, the movable conveyor device 106 is lifted from the conveying position to the non-conveying position using the handle 116 attached to the movable conveyor device 106. As shown in FIG. 8, the handle 116 is structured in a manner to be in parallel with the vertical mast 103 and fully housed within a width of the vertical mast 103 of the conveyor frame 102 such that the handle 116 does not protrude or obstruct the pathway 201 (shown in FIG. 2) when the movable conveyor device 106 is in the non-conveying position.

According to an embodiment, when the movable conveyor device 106 is transitioned from the conveying position to the non-conveying position, the bracket 112 rotates about the pivot point on the movable conveyor device 106 to pivot the bracket 112 and extend it towards and over the downstream fixed conveyor device 104b. As shown in FIG. 8, the bracket 112 with multiple rollers 602 is positioned above the downstream fixed conveyor device 104b in the non-conveying position. Similarly, when the movable conveyor device 106 is transitioned from the non-conveying position to the conveying position, the bracket 112 rotates about the pivot point to pivot the bracket 112 and retract it away from the downstream fixed conveyor device 104b. As shown in FIG. 7, the bracket 112 with multiple rollers 602 is in the retracted state abutting the downstream fixed conveyor device 104b and bridging the gap between the downstream fixed conveyor device 104b and the movable conveyor device 106. Further, as shown in FIG. 8, the movable conveyor device 106 is locked in the non-conveying position using the locking mechanism 118. The locking pin 508 is inserted into the locking bracket 119 on the conveyor frame 102 to lock the movable conveyor device 106 in the non-conveying position. As shown in FIG. 8, the movable conveyor device 106 is structured in a manner to be in parallel with the vertical mast 103 and fully housed within the width of the vertical mast 103 of the conveyor frame 102 such that the movable conveyor device 106 does not protrude or obstruct the pathway 201 (shown in FIG. 2) when the movable conveyor device 106 is in the non-conveying position. According to an embodiment, when the movable conveyor device is in the non-conveying position, the movable conveyor device 106 may be positioned at an angle of about 90-degree with respect to the downstream fixed conveyor device. As shown in FIG. 8, when the movable conveyor device 106 is positioned at the 90-degree angle, the bracket 112 with multiple rollers 602 is fully positioned on top of the conveyor rollers 107 of the downstream fixed conveyor device 104b.

Unlike conventional lift gate, the lift gate apparatus of the present disclosure minimizes use of multiple mounting components beneath the lift gate and bridges a gap between the lift gate and neighboring downstream conveyor devices. As shown in FIGS. 7 and 8, the lift gate apparatus bridges the gap between the lift gate apparatus and the neighboring conveyor devices while maintaining minimal lifting and mounting components (as shown in FIG. 4). In this regard, the lift gate apparatus of the present disclosure does not obstruct the pathway of the operator and the material handling vehicle. Further, the lift gate apparatus uses the gas springs and the locking pin to address the safety issues due to slamming effect of conventional lift gates. Further, the lift gate apparatus can be retrofitted to any conveyor systems as it requires minimal lifting and mounting components. Therefore, the lift gate apparatus of the present disclosure provides an unobstructed safe pathway for the item and the operator and the material handling vehicle by the synergetic operation of components such as the movable conveyor device, the lifting mechanism, the locking mechanism and the bracket.

Figure 9:
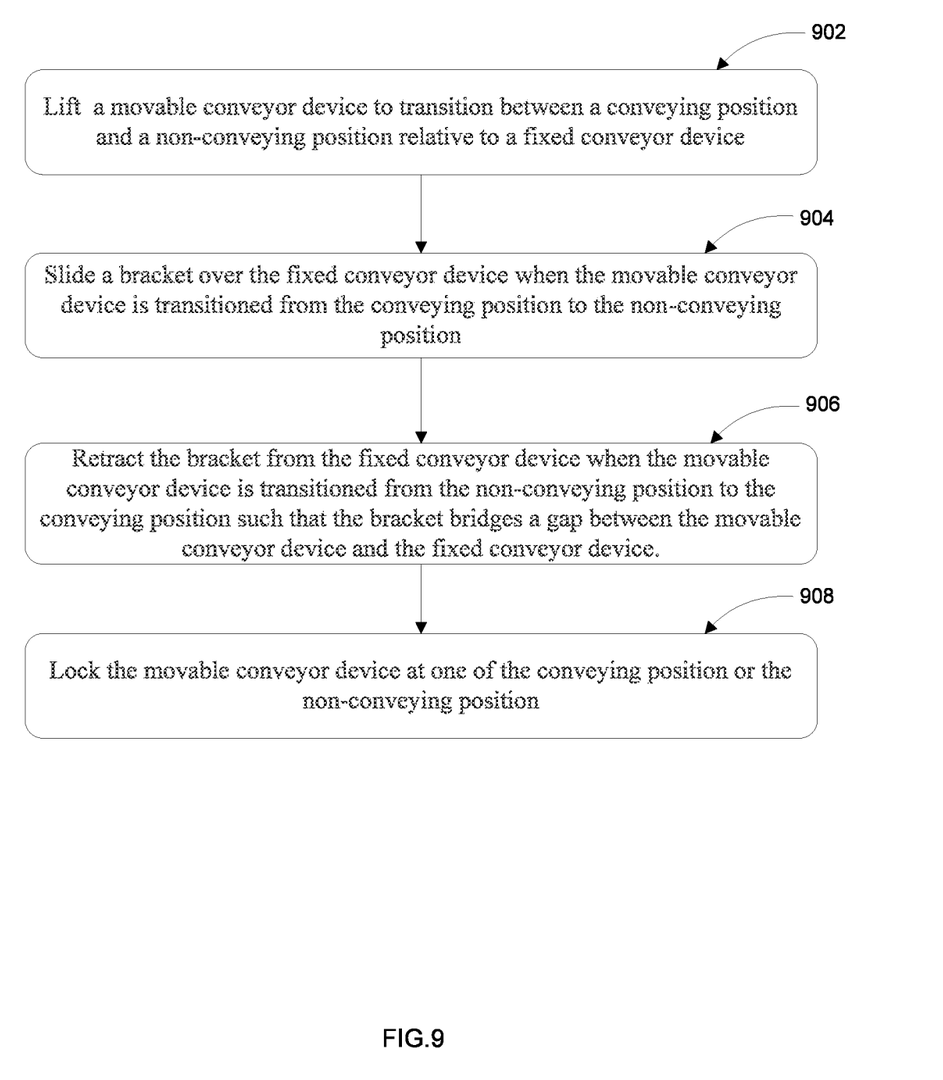
FIG. 9 illustrates a flowchart depicting a method for operating the lift gate apparatus of FIG. 1 in accordance with an embodiment of the present invention.

FIG. 9 illustrates a flowchart depicting a method for operating the lift gate apparatus of FIG. 1 in accordance with an embodiment of the present invention. The lift gate apparatus includes a movable conveyor device, a lifting mechanism, a locking mechanism and a bracket. The lifting mechanism includes a handle and a pair of gas springs. At step 902, the movable conveyor device is lifted using the handle from a conveying position to a non-conveying position. For example, an operator may use the handle to hold and lift the movable conveyor device from the conveying position to the non-conveying position and vice-versa. When the movable conveyor device is lifted from the conveying position to the non-conveying position and vice-versa, the gas spring is configured to gradually transition the movable conveyor device by compressing and expanding the gas spring such that a smooth transition is maintained without sudden impact or jerk avoiding accidental fall back. Further, when the movable conveyor device is transitioned to the non-conveying position, the movable conveyor device is locked with the conveyor frame using the locking mechanism. The locking mechanism includes a locking pin and a locking bracket. The locking pin attached to the movable conveyor device is latched to the locking bracket on the conveyor frame to hold the movable conveyor device at the non-conveying position preventing from accidental fall back of the movable conveyor device to the conveying position. When the movable conveyor device is transitioned to the non-conveying position using the lifting mechanism, a space or a pathway is created for the operator or the material handling vehicle as shown in FIGS. 2 and 3 allowing the operator and the material handling vehicle to pass through the pathway.

When the movable conveyor device is gradually lifted to the non-conveying position using the handle and the gas spring, at step 904, the bracket attached to the movable conveyor device gradually slides over a fixed conveyor device positioned downstream of the movable conveyor device. The bracket includes an angled front portion which facilitates the bracket to slide over the fixed conveyor device. The bracket includes rollers positioned adjacent to the angled front portion such that the bracket may move back and forth over the fixed conveyor device. According to an embodiment, the bracket rotates about a pivot point on the movable conveyor device to pivot the bracket and extend it towards and over the fixed conveyor device when the movable conveyor device is transitioned from the conveying position to the non-conveying position.

According to an embodiment, the movable conveyor device is transitioned back to the conveying position by releasing the locking pin and lowering the movable conveyor device under the influence of the gas spring. While the movable conveyor device is transitioned to the conveying position, at step 906, the bracket simultaneously retracts from the fixed conveyor device such that the bracket bridges a gap between the movable conveyor device and the fixed conveyor device allowing the items to pass over the bracket without getting trapped in the gap. According to an embodiment, the bracket rotates about the pivot point to pivot the bracket and retract it away from the fixed conveyor device when the movable conveyor device is transitioned from the non-conveying position to the conveying position.

Further, at step 908, after the movable conveyor device is transitioned to the conveying position the locking pin latches with another locking bracket on the conveyor frame to hold the movable conveyor device at the conveying position and to avoid accidental lifting of the movable conveyor device during normal operation. In this regard, the movable conveyor device is locked in both the conveying position and the non-conveying position to prevent accidental fall back and accidental lifting. Therefore, the components of the lift gate apparatus such as the movable conveyor device, the lifting mechanism, the locking mechanism and the bracket operates in synergy to create a pathway for the item and the operator or the material handling vehicle without compromising on the safety. Since the lift gate apparatus has fewer mounting components such as the gas spring, the hinge plate and the bracket attached to the movable conveyor device, the lift gate apparatus may be retrofitted to any conveyor system requiring a safe pathway for the item as well the operator or the material handling vehicle.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose.

The invention claimed is:

1. A lift gate apparatus comprising:
   a movable conveyor device configured to transition between a conveying position and a non-conveying position; and
   a bracket comprising at least one roller, the bracket configured to bridge a gap between the movable conveyor device and a fixed conveyor device, wherein the bracket pivots and slides over the fixed conveyor device when the movable conveyor device is transitioned from the conveying position to the non-conveying position.

2. The lift gate apparatus of claim 1, further comprising a lifting mechanism to lift the movable conveyor device to the non-conveying position from the conveying position and lower the movable conveyor device back to the conveying position.

3. The lift gate apparatus of claim 2, wherein the lifting mechanism comprises a handle and a pair of gas springs.

4. The lift gate apparatus of claim 1, wherein the fixed conveyor device and the movable conveyor device comprises at least one of conveyor rollers, a conveyor belt, and a slider pan.

5. The lift gate apparatus of claim 1, wherein the bracket rotates about a pivot point to pivot the bracket and extend it towards and over the fixed conveyor device when the movable conveyor device is transitioned from the conveying position to the non-conveying position.

6. The lift gate apparatus of claim 1, wherein the bracket rotates about the pivot point to pivot the bracket and retract it away from the fixed conveyor device when the movable conveyor device is transitioned from the non-conveying position to the conveying position.

7. The lift gate apparatus of claim 1, wherein the movable conveyor device is lifted to at an angle of at least 90 degrees relative the fixed conveyor device.

8. The lift gate apparatus of claim 1, wherein the bracket comprises an angled front portion to slide the bracket over the fixed conveyor device such that the at least one roller moves back and forth over the fixed conveyor device when the movable conveyor device is transitioned between the conveying position and the non-conveying position.

9. The lift gate apparatus of claim 8, wherein the angled front portion of the bracket abuts the fixed conveyor device when the movable conveyor device is at the conveying position and wherein the angled front portion of the bracket is above the fixed conveyor device when the movable conveyor device is at the non-conveying position.

10. The lift gate apparatus of claim 1, further comprising a locking mechanism to lock the movable conveyor device at one of the conveying position or the non-conveying position.

11. The lift gate apparatus of claim 10, wherein the locking mechanism is a retractable spring pin.

12. The lift gate apparatus of claim 1, further comprising a sensor to determine if the movable conveyor device is in the conveying position or the non-conveying position.

13. A conveyor system comprising:
   a plurality of conveyor devices; and
   a lift gate apparatus comprising:
      a first conveyor device configured to be raised from a first position to a second position and lowered back from the second position to the first position; and
      a bracket that comprises at least one roller, the bracket attached to the first conveyor device, wherein the bracket is configured to pivot and slide over a second conveyor device of the plurality of conveyor devices when the first conveyor device is raised from the first position to the second position.

14. The conveyor system of claim 13, wherein the lift gate apparatus further comprises a lifting mechanism to raise and lower the first conveyor device from the first position and the second position respectively.

15. The conveyor system of claim 13, wherein the lift gate apparatus further comprises an angled front portion to slide the bracket over the second conveyor device such that the at least one roller moves back and forth over the second conveyor device when the first conveyor device is transitioned between the first position and the second position.

16. The conveyor system of claim 15, wherein the angled front portion of the bracket abuts the second conveyor device when the first conveyor device is at the first position and wherein the angled front portion of the bracket is above the second conveyor device when the first conveyor device is at the second position.

17. The conveyor system of claim 13, wherein the bracket is configured to bridge a gap between the first conveyor device and the second conveyor device when the first conveyor device is in the first position.

18. The conveyor system of claim 13, wherein the first conveyor device is lifted to at an angle of at least 90 degrees from the first position.

19. A method for operating a lift gate apparatus comprising:
   lifting a movable conveyor device to transition between a conveying position and a non-conveying position relative to a fixed conveyor device;
   sliding a bracket over the fixed conveyor device when the movable conveyor device is transitioned from the conveying position to the non-conveying position, wherein the bracket comprises at least one roller; and
   retracting the bracket from the fixed conveyor device when the movable conveyor device is transitioned from the non-conveying position to the conveying position such that the bracket bridges a gap between the movable conveyor device and the fixed conveyor device.

20. The method of claim 19, further comprising:
   locking the movable conveyor device at one of the conveying position or the non-conveying position.

* * * * *